US011150534B2

(12) United States Patent
Choi (10) Patent No.: US 11,150,534 B2
(45) Date of Patent: Oct. 19, 2021

(54) CAMERA MODULE INCLUDING LIQUID LENS, AND OPTICAL DEVICE

(71) Applicant: LG INNOTEK CO., LTD., Seoul (KR)

(72) Inventor: Yong Bok Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 240 days.

(21) Appl. No.: 16/484,744

(22) PCT Filed: Feb. 9, 2018

(86) PCT No.: PCT/KR2018/001741
§ 371 (c)(1),
(2) Date: Aug. 8, 2019

(87) PCT Pub. No.: WO2018/147670
PCT Pub. Date: Aug. 16, 2018

(65) Prior Publication Data
US 2020/0159084 A1    May 21, 2020

(30) Foreign Application Priority Data

Feb. 9, 2017    (KR) .................... 10-2017-0017902

(51) Int. Cl.
  *G02B 7/02*    (2021.01)
  *G02F 1/29*    (2006.01)
  *G02B 7/09*    (2021.01)
  *G02B 27/64*   (2006.01)
(52) U.S. Cl.
  CPC .............. *G02F 1/29* (2013.01); *G02B 7/021* (2013.01); *G02B 7/09* (2013.01); *G02B 27/646* (2013.01)

(58) Field of Classification Search
  CPC ........ G02B 27/646; G02B 7/02; G02B 7/021; G02B 7/04; G02B 7/09; G02F 1/29; G02F 1/294
  USPC ........................................................ 359/315
  See application file for complete search history.

(56) References Cited

U.S. PATENT DOCUMENTS 8,054,369 B2 * 11/2011 Tseng ................... G02B 7/022
                                                  348/340
8,698,951 B2    4/2014 Kang et al.
2008/0013187 A1 * 1/2008 Craen .................. G02B 7/021
                                                  359/665

(Continued)

FOREIGN PATENT DOCUMENTS

CN    101349795 A    1/2009
CN    101349795 B    9/2010

(Continued)

*Primary Examiner* — William R Alexander
(74) *Attorney, Agent, or Firm* — Birch, Stewart, Kolasch & Birch, LLP (57) ABSTRACT

One embodiment provides a camera module including a cover; a holder disposed inside the cover; a solid lens and a liquid lens in the holder; and a connection board supplying an electric current to the liquid lens, wherein the holder includes: a first opening and a second opening facing the first opening in a direction perpendicular to an optical axis, the liquid lens is arranged in the first opening and the second opening, and a guide portion is formed on a region of the cover, which faces the connection board, so as to protrude from an inner side surface of the cover toward the connection board.

20 Claims, 5 Drawing Sheets

(56) References Cited

U.S. PATENT DOCUMENTS

| | | | |
|---|---|---|---|
| 2008/0267603 A1 | 10/2008 | Jung et al. | |
| 2010/0123814 A1* | 5/2010 | Tseng | H04N 5/2257 |
| | | | 348/333.01 |
| 2010/0247086 A1* | 9/2010 | Tallaron | G02B 13/004 |
| | | | 396/133 |
| 2010/0302646 A1 | 12/2010 | Takai et al. | |
| 2012/0037820 A1 | 2/2012 | Komi | |
| 2012/0105971 A1 | 5/2012 | Lee et al. | |
| 2012/0169988 A1 | 7/2012 | Ko | |
| 2012/0236248 A1 | 9/2012 | Kang et al. | |
| 2014/0029120 A1 | 1/2014 | Kim | |
| 2020/0159084 A1 | 5/2020 | Choi | |

FOREIGN PATENT DOCUMENTS

| | | |
|---|---|---|
| CN | 102681300 A | 9/2012 |
| CN | 105739217 A | 7/2016 |
| JP | 2006-309011 A | 11/2006 |
| JP | 2009-276450 A | 11/2009 |
| JP | 4402164 B1 | 1/2010 |
| JP | 2010-250126 A | 11/2010 |
| KR | 10-2007-0008169 A | 1/2007 |
| KR | 10-0843473 B1 | 7/2008 |
| KR | 10-0867525 B1 | 11/2008 |
| KR | 10-2011-0108183 A | 10/2011 |
| KR | 10-2012-0045517 A | 5/2012 |
| KR | 10-2012-0106001 A | 9/2012 |
| KR | 10-2014-0016033 A | 2/2014 |
| WO | WO 2018/14767 A1 | 8/2018 |

\* cited by examiner

CAMERA MODULE INCLUDING LIQUID LENS, AND OPTICAL DEVICE

CROSS REFERENCE TO RELATED APPLICATIONS

This application is the National Phase of PCT International Application No. PCT/KR2018/001741, filed on Feb. 9, 2018, which claims priority under 35 U.S.C. 119(a) to Patent Application No. 10-2017-0017902, filed in the Republic of Korea on Feb. 9, 2017, all of which are hereby expressly incorporated by reference into the present application.

TECHNICAL FIELD

Embodiments relate to a camera module including a liquid lens enabling adjustment of a focal length/distance using electrical energy, and an optical device.

BACKGROUND ART

People who use portable devices demand optical devices that have high resolution, are small, and have various photographing functions (an autofocus (AF) function, a hand-tremor compensation or optical image stabilization (OIS) function, etc.). Such photographing functions may be realized by directly moving a plurality of lenses that are combined. In the case in which the number of lenses is increased, however, the size of an optical device may be increased.

The autofocus and hand-tremor compensation functions are performed by tilting or moving a lens module including a plurality of lenses, which are fixed to a lens holder in the state in which the optical axes of the lenses are aligned, along the optical axis or in a direction perpendicular to the optical axis. An additional lens-moving apparatus is used to move the lens module. However, the lens-moving apparatus consumes a lot of power, requires driving members, such as magnets and coils, to move the lens module, and requires extra space corresponding to the moving range of the lens module in order to move the lens module, thus leading to an increase in the overall thickness of a camera module and an optical device.

Therefore, research has been conducted on a liquid lens configured to electrically adjust the curvature of an interface between two kinds of liquid in order to perform autofocus and hand-tremor compensation functions.

DISCLOSURE

Technical Problem

Embodiments provide a camera module capable of performing an AF or OIS function using a liquid lens, and an optical device.

Technical Solution

In one embodiment, a camera module may include a cover, a solid lens and a liquid lens disposed inside the cover, and a connection board supplying current to the liquid lens, wherein a guide portion may be formed on an inner side surface of the cover in a region that faces the connection board.

The guide portion may be formed such that a portion of the cover is recessed inwards.

The connection board may be disposed on the bottom surface of the cover toward the liquid lens, and the guide portion may be in surface contact with a first portion of the connection board.

The connection board may include a second portion disposed under the first portion and having a larger width than the first portion.

The connection board may include a first connection board and a second connection board, the first connection board may be connected to a first electrode of the liquid lens, and the second connection board may be connected to a second electrode of the liquid lens.

The first connection board and the second connection board may be disposed opposite each other, with the liquid lens interposed therebetween.

In another embodiment, an imaging lens may include a cover, a solid lens and a liquid lens disposed inside the cover, and a connection board supplying current to the liquid lens, wherein an open region may be formed in a region of the cover that faces the connection board, protruding portions may be formed toward the open region of the cover, and the protruding portions may be in surface contact with a portion of the connection board.

The protruding portions may be in surface contact with a portion of the connection board at two opposite sides of the open region.

The connection board may be disposed in a first direction, and the protruding portions may be disposed in a second direction that intersects the first direction.

The first direction may be a direction from the bottom surface of the cover toward the liquid lens.

The connection board may include a first portion and a second portion disposed under the first portion and having a larger width than the first portion, and the protruding portions may be in contact with the second portion.

The connection board may include a first connection board and a second connection board, the first connection board may be connected to a first electrode of the liquid lens, and the second connection board may be connected to a second electrode of the liquid lens.

The first connection board and the second connection board may be disposed opposite each other, with the liquid lens interposed therebetween.

The liquid lens may include a first plate including a cavity formed therein to accommodate a first liquid, which is conductive, and a second liquid, which is non-conductive, therein, a first electrode disposed on the first plate, a second electrode disposed under the first plate, a second plate disposed on the first electrode, and a third plate disposed under the second electrode.

In still another embodiment, an optical device may include a camera module, including a cover, a solid lens and a liquid lens disposed inside the cover, and a connection board supplying current to the liquid lens, wherein a guide portion is formed on an inner side surface of the cover in a region that faces the connection board, a filter configured to selectively allow light that has passed through an imaging lens to pass therethrough depending on a wavelength, a light-receiving element configured to receive light that has passed through the filter, and an image sensor configured to convert an image incident through the imaging lens into an electrical signal.

Advantageous Effects

In a camera module including a liquid lens and an optical device according to the embodiments, a guide portion provided at a cover is recessed toward an internal space so as to come into surface contact with a connection board, thereby fixing the connection board.

In addition, protruding portions provided at the cover are provided toward the connection board so as to come into surface contact with the connection board, thereby fixing the connection board.

BEST MODE

Hereinafter, embodiments for accomplishing the aforementioned objects will be described with reference to the accompanying drawings.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

Figure 1:
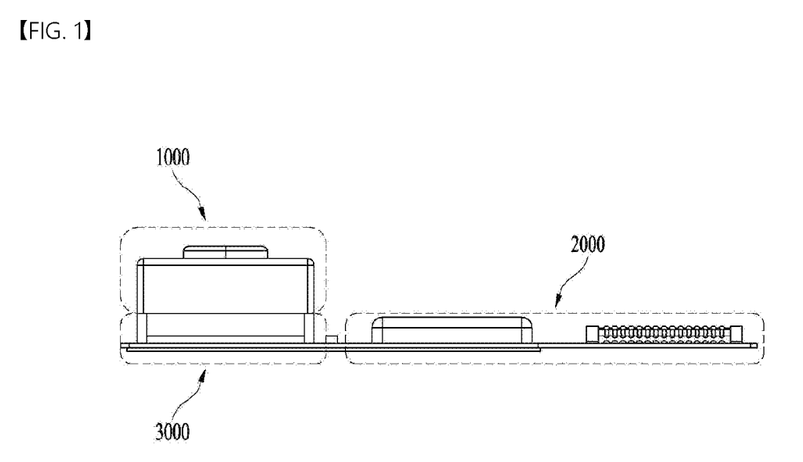
FIG. 1 is a view illustrating one embodiment of a camera module.

FIG. 1 is a view illustrating one embodiment of a camera module. Referring to FIG. 1, the camera module may include a lens assembly 1000, a control circuit 2000, and an image sensor 3000. The lens assembly 1000 may include a liquid lens, which enables adjustment of a focal length in response to driving voltages applied between a common terminal and a plurality of individual terminals. The control circuit 2000 may control driving voltages or supply driving voltages to the liquid lens. The image sensor 3000 may be aligned with the lens assembly 1000, and may convert light transmitted through the lens assembly 1000 into an electrical signal. The configuration of the control circuit 2000 may be designed differently in accordance with the specifications required for the camera module. In particular, in order to reduce the intensity of the operating voltage applied to the lens assembly 1000, the control circuit 2000 may be implemented as a single chip. As a result, it is possible to further reduce the size of the camera module that is mounted in a portable device.

Figure 2A:
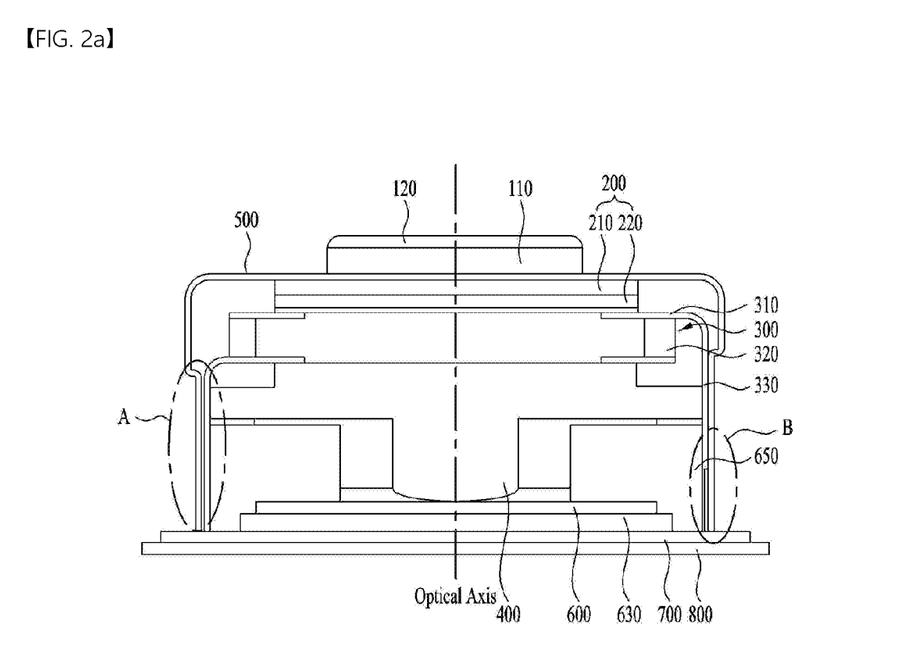
FIG. 2a is a view illustrating one embodiment of the camera module shown in FIG. 1, which includes a lens assembly, including a liquid lens, and a cover.
Figure 2B:
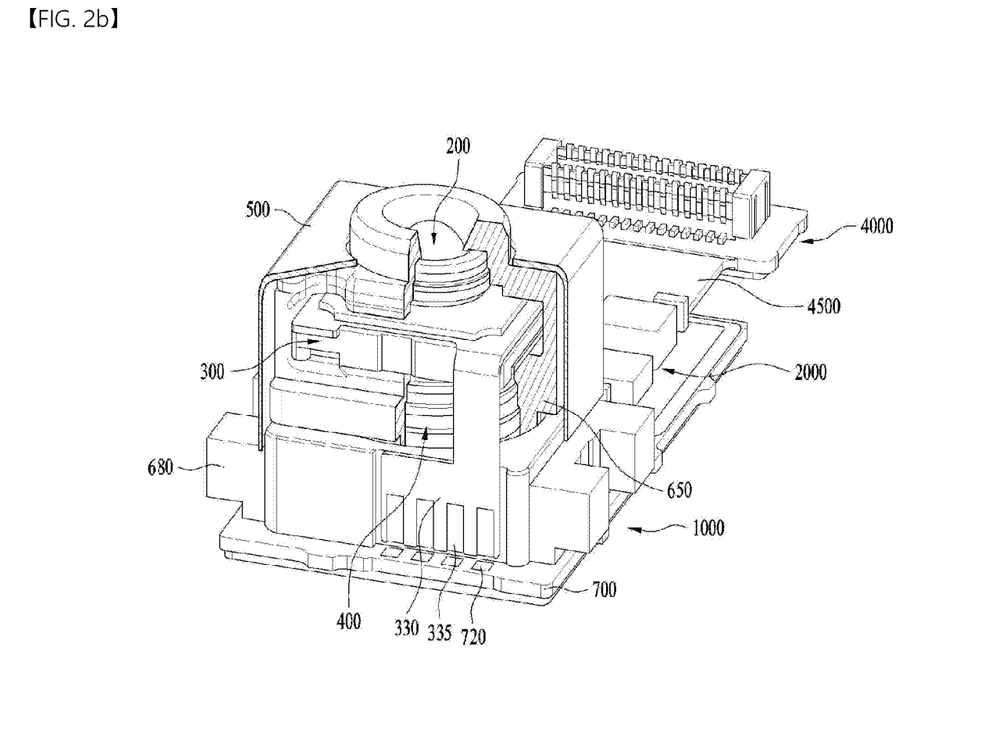
FIG. 2b is a view illustrating one embodiment of the camera module shown in FIG. 1, which includes a lens assembly, including a liquid lens, and a cover.
Figure 2C:
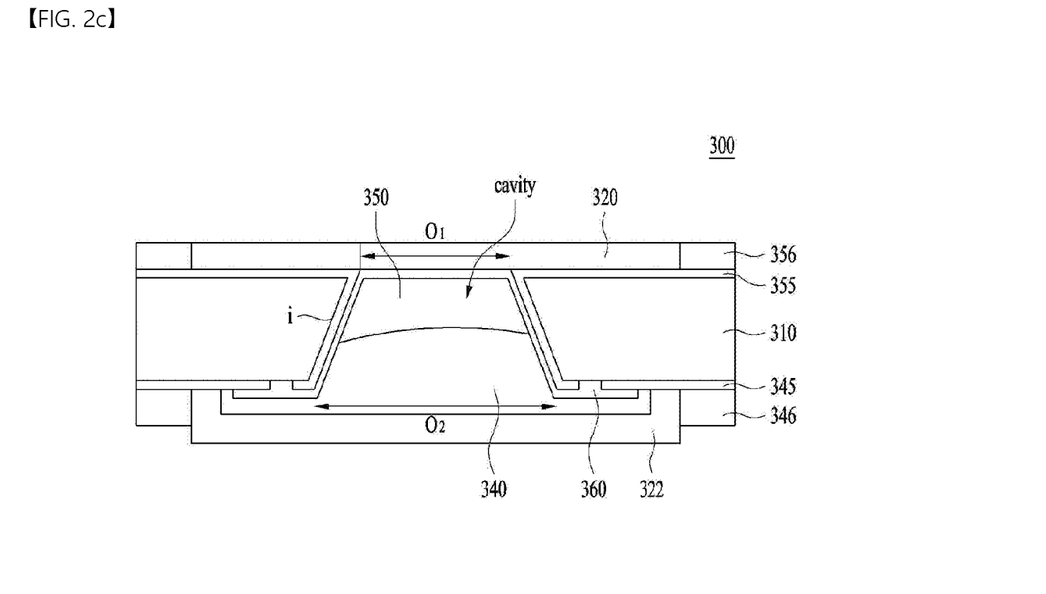
FIG. 2c is a view illustrating the liquid lens disposed inside the camera module.

FIGS. 2a to 2c is a view illustrating the camera module shown in FIG. 1, which includes the lens assembly, including the liquid lens, and a cover.

Referring to FIGS. 2a to 2c, the lens assembly 1000 may be an imaging lens, and may include a first lens unit 200, a second lens unit 400, a liquid lens 300, a cover 500, and a holder 650.

The illustrated structure of the lens assembly 1000 is just one example, and the structure of the lens assembly 1000 may be changed depending on the specifications required for the camera module. For example, in the illustrated example, the liquid lens 300 is disposed between the first lens unit 200 and the second lens unit 400. However, in another example, the liquid lens 300 may be disposed on the front surface of the first lens unit 200 (above the first lens unit in FIG. 2), and the second lens unit 400 may be omitted.

The first lens unit 200 may be disposed at the front side of the lens assembly 1000, and may be a region on which light is incident from outside the lens assembly 1000. The first lens unit 200 may include at least one lens, or two or more lenses may be aligned along a center axis PL to form an optical system. Here, the center axis PL may be the same as the optical axis of the optical system.

The first lens unit 200 may include two lenses 210 and 220. However, the disclosure is not limited thereto.

The first lens unit 200, the second lens unit 400, and the liquid lens 300 may be mounted in a through-hole formed in the holder 650. Further, the liquid lens 300 may be inserted and disposed in a first opening and a second opening, which are formed in a direction perpendicular to the optical axis. The first opening and the second opening may face each other, and a part of the liquid lens may be disposed in the first opening or the second opening.

An exposure lens 110 may be provided on the front surface of the first lens unit 200, and a cover glass 120 may be disposed in front of the exposure lens 110. The exposure lens 110 may protrude so as to be exposed to the outside of the cover 500, and thus the surface thereof may be damaged. If the surface of the lens is damaged, the quality of an image captured by the camera module may be deteriorated. In order to prevent or suppress damage to the surface of the exposure lens 110, a method of disposing the cover glass 120, a method of forming a coating layer, or a method of forming the exposure lens 110 using a wear-resistant material for preventing damage to the surface of the exposure lens may be applied.

The second lens unit 400 may be disposed at the rear of the first lens unit 200 and the liquid lens 300, and the light incident on the first lens unit 200 from the outside may pass through the liquid lens 300 and may be incident on the second lens unit 400. The second lens unit 400 may be spaced apart from the first lens unit 200, and may be disposed in the through-hole formed in the holder 650.

The second lens unit 400 may include at least one lens, and when two or more lenses are included, the lenses may be aligned along the center axis PL to form an optical system.

The liquid lens unit 300 may be disposed between the first lens unit 200 and the second lens unit 400, and may be inserted into an insertion hole (not shown) formed in the cover 500. The liquid lens unit 300 may also be aligned along the center axis PL in the same manner as the first lens unit 200 and the second lens unit 400.

The liquid lens 300 may include a cavity (not shown) formed in a body 310. The cavity may be a region that light that has passed through the first lens unit 200 penetrates, and may contain a liquid in at least a portion thereof.

For example, two kinds of liquid, i.e. a conductive liquid and a non-conductive liquid, may be contained in the cavity, and the conductive liquid and the non-conductive liquid may form an interface therebetween without being mixed with each other.

The liquid lens 300 may include a connection part 330. The connection part 330 may be disposed under the lens assembly 1000, and may electrically and/or physically connect a sensor board 700, on which the image sensor is disposed, to the liquid lens 300. One or two or more connection parts 330 may be provided to connect the liquid lens 300 to the sensor board 700 on which the image sensor is disposed. The connection part 330 may include a flexible printed circuit board (FPCB) or a metal plate made of a conductive metal material. The interface formed between the conductive liquid and the non-conductive liquid may be deformed by a driving voltage applied to the liquid lens 300 through the connection part 330, whereby the curvature of the interface of the liquid lens 300 or the focal length of the liquid lens 300 may be changed. When deformation of the interface and the change in the curvature thereof are controlled, the liquid lens 300, a camera module including the same, and an optical device may perform an autofocus (AF) function, a hand-tremor compensation or optical image stabilization (OIS) function, etc.

The liquid lens 300 may include a part to be connected with the above-described control circuit 2000 and a part to be fixed with the cover 500, in addition to the components thereof to be described later.

The holder 650 may support the edge of the second lens unit 400 at the lower side of the second lens unit 400. An image sensor 600 may be disposed in a region to which light travels from the second lens unit 400, and an insulation member 630 may be disposed under the image sensor 600.

The image sensor 600 is electrically insulated from the sensor board 700 by the insulation member 630, and the sensor board 700 may be supported by a support board 800.

FIG. 2b is a view illustrating one embodiment of the camera module shown in FIG. 1, which includes the lens assembly, including the liquid lens, and the cover.

The camera module may include a lens assembly 1000 and a control circuit 2000.

The lens assembly 1000 may include a solid lens and a liquid lens. The solid lens may be disposed on or under the liquid lens. The lens assembly may further include a holder, and the solid lens and the liquid lens may be disposed inside the holder.

For example, the lens assembly 1000 may be configured such that the first lens unit 200, the liquid lens 300, and the second lens unit 400 are disposed inside the holder 650 in a direction from above to below. A terminal 335 of the connection part 330, which supplies a driving voltage to the liquid lens 300, may be connected to a terminal 720 of the sensor board 700. The holder 650 may be disposed on a base 680, and the cover 500 may be disposed so as to surround the side surface of the holder 650.

The illustrated structure of the lens assembly 1000 is just one example, and the structure of the lens assembly 1000 may be changed depending on the specifications required for the camera module. For example, one of the first lens unit 200 and the second lens unit 400 may be omitted.

The control circuit 2000 may supply a driving voltage to the liquid lens. The camera module may further include a connector 4000, and the connector 4000 may electrically connect the control circuit 2000 to an external power source or other devices. The connector 4000 may be electrically connected to the control circuit 2000 via a connection part 4500.

The configuration of the control circuit 2000 may be designed differently in accordance with the specifications required for the camera module. In particular, in order to reduce the intensity of the operating voltage applied to the lens assembly 1000, the control circuit 2000 may be implemented as a single chip. As a result, it is possible to further reduce the size of the camera module that is mounted in a portable device.

The lens assembly 1000 may include a liquid lens and/or a solid lens. The liquid lens may include a conductive liquid and a non-conductive liquid, and may further include a common terminal and a plurality of individual terminals. The shape of an interface formed between the conductive liquid and the non-conductive liquid may be changed in response to the driving voltage applied between the common terminal and the individual terminals, and accordingly the focal length may be changed.

The first lens unit 200 may be disposed at the front side of the lens assembly 1000, and may be a region on which light is incident from outside the lens assembly 1000. The first lens unit 200 may include at least one lens, or two or more lenses may be aligned along a center axis to form an optical system. Here, the center axis may be the same as the optical axis of the optical system.

The first lens unit 200 may include two lenses. However, the disclosure is not limited thereto.

The first lens unit 200, the second lens unit 400, and the liquid lens 300 may be mounted in a through-hole formed in the holder 650. In order to distinguish the first and second lens units 200 and 400 from the liquid lens 300, the first and second lens units 100 and 400 may be referred to as first and second solid lens units or first and second optical lens units, and may be made of a glass-based or plastic-based material.

The liquid lens 300 may be disposed under the first lens unit 200, and the second lens unit 400 may be disposed under the liquid lens 300. The light that is incident on the first lens unit 200 from the outside may pass through the liquid lens 300 and then may be incident on the second lens unit 400. The second lens unit 400 may be spaced apart from the first lens unit 200.

The second lens unit 400 may include at least one lens, and when two or more lenses are included in the second lens unit 400, the lenses may be aligned along the center axis or the optical axis to form an optical system.

The liquid lens 300 may be aligned along the center axis in the same manner as the first lens unit 200 and the second lens unit 400.

FIG. 2c is a view illustrating the liquid lens disposed inside the camera module.

The liquid lens 300 may include liquids, a first plate, and electrodes. The liquids may include a first liquid 340, which is conductive, and a second liquid 350, which is non-conductive. The first plate 310 corresponding to the aforementioned body may include a cavity in which the liquids are disposed. The electrodes may be disposed on or under the first plate. For example, a first electrode 345 may be disposed under the first plate, and a second electrode 355 may be disposed on the first plate. A second plate or a third plate may be disposed on or under the first plate. For example, the third plate 322 may be disposed under the first electrode 345, the second plate 320 may be disposed on the second electrode 355, and at least one of the second plate or the third plate may be omitted.

The first plate 310 may be disposed between the second plate 320 and the third plate 322, and may include upper and lower openings, each having a predetermined inclined surface. The region surrounded by the aforementioned inclined surface, the first opening contacting the second plate 320, and the second opening contacting the third plate 322 may be defined as a 'cavity'.

In the embodiment, the size $O_2$ of the second opening may be larger than the size $O_1$ of the first opening. Here, the size of the opening may refer to the cross-sectional area thereof in a horizontal direction. When the opening has a circular cross-section, the size of the opening may refer to a radius, and when the opening has a square cross-section, the size of the opening may refer to a diagonal length.

The first plate 310 is a structure that accommodates the first and second liquids 340 and 350 therein. Each of the second plate 320 and the third plate 322 may include a region through which light passes, and thus may be made of a light-transmitting material such as, for example, glass. The second plate 320 and the third plate 322 may be made of the same material for convenience of processing.

Further, the first plate 310 may made of a transparent material, and may also include impurities so that light does not easily pass therethrough.

The second plate 320 is a structure through which light incident thereon from the first lens unit 200 travels to the interior of the cavity, and the third plate 322 is a structure through which the light that has passed through the cavity travels to the second lens unit 400.

The aforementioned cavity may be filled with the first liquid 340 and the second liquid 350, having different properties from each other, and an interface may be formed between the first liquid 340 and the second liquid 350. The curvature and the inclination of the interface formed between the first liquid 340 and the second liquid 350 may be changed.

The second liquid 350 may be oil, e.g. phenyl-based silicon oil.

The first liquid 340 may be made of, for example, a mixture of ethylene glycol and sodium bromide (NaBr).

Each of the first liquid 340 and the second liquid 350 may include at least one of a sterilizing agent or an antioxidant. The antioxidant may be a phenyl-based antioxidant or a phosphorus (P)-based antioxidant. The sterilizing agent may be any one of an alcohol-based sterilizing agent, an aldehyde-based sterilizing agent, and a phenol-based sterilizing agent.

The first electrode 345 may be disposed on a portion of the lower surface of the first plate 310, and may be in direct contact with the first liquid 340. The second electrode 355 may be spaced apart from the first electrode 345, and may be disposed on the upper surface, the side surface and the lower surface of the first plate 310.

The first electrode 345 and the second electrode 355 may be made of a conductive material, e.g. metal, and specifically may include chrome (Cr). Chromium or chrome is a glossy silver rigid transition metal, which is not fragile, does not readily discolor, and has a high melting point.

The insulation layer 360 may be disposed so as to cover a portion of the lower surface of the second plate 320 in the upper region of the cavity, and a portion of the second electrode 355 disposed on the side wall of the cavity. In addition, the insulation layer 360 may be disposed so as to cover an entire of the second electrode 355, the first plate 310, and a portion of the first electrode 345 on the lower surface of the first plate 310. The insulation layer 360 may be implemented as, for example, a parylene C coating agent, and may further include a white dye. The white dye may increase the frequency at which light is reflected by the insulation layer 360 forming the side wall i of the cavity.

As illustrated, the insulation layer 360 may be disposed between the second liquid 350 and the second plate 320. The first liquid 340 may be in direct contact with the third plate 322.

Each of the second plate 320 and the third plate 322 may have rectangular edges. However, the disclosure is not limited thereto.

The second electrode 355 may be exposed from at least one region of the edges of the second plate 320, and the first electrode 345 may be exposed from at least one region of the edges of the third plate 322.

In addition, a second contact electrode 356 may be disposed on the second electrode 355 in the outer region of the second plate 320, and a first contact electrode 346 may be disposed on the first electrode 345 in the outer region of the third plate 322. Each of the first and second contact electrodes 346 and 356 may be a part of the above-described connection part 330.

Although not illustrated, a conductive epoxy may be disposed between the second electrode 355 and the second contact electrode 356, and may also be disposed between the first electrode 345 and the first contact electrode 346.

Figure 3:
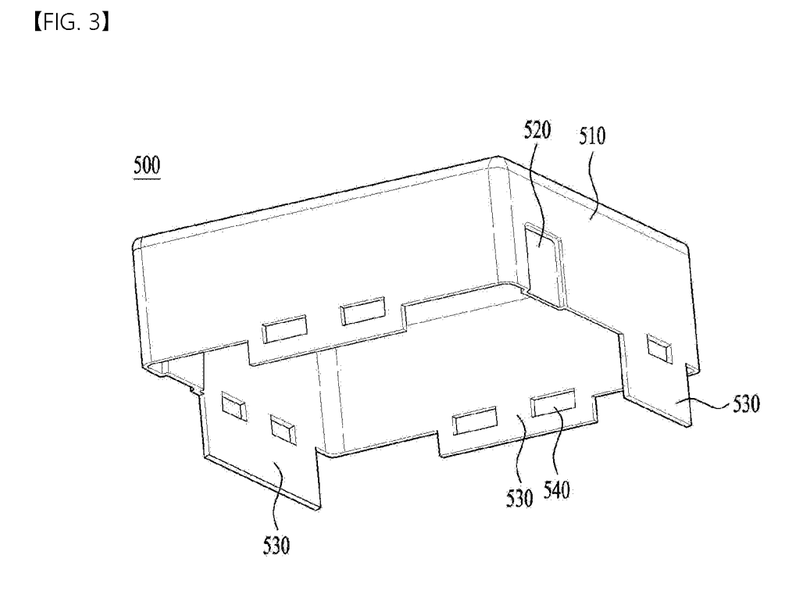
FIG. 3 is a view illustrating the cover shown in FIG. 2.

FIG. 3 is a view illustrating the cover shown in FIGS. 2a and 2b.

The cover 500 may include an upper surface and a lower surface, at least a portion of each of which is open. The exposure lens 110 shown in FIG. 2 may be disposed on the upper surface of the cover, and the image sensor 600 shown in FIG. 2a may be disposed on the lower surface of the cover. The exposure lens 110 may be omitted.

At least one guide portion 520 may be formed on a side portion 510 of the cover 500. For example, the guide portion 520 may be formed such that a portion of the side portion 510 protrudes or is recessed toward the interior of the cover 500 in which the holder 650 is disposed. The connection part 330 may be disposed between the holder 650 and the guide portion 520 formed on the side portion 510. An extension portion 530 may be formed so as to extend downwards from the side portion 510. The extension portion 530 is formed at each of the four sides of the side portion 510. However, the disclosure is not limited thereto.

At least one open region 540 may be formed between the side portion 510 and each extension portion 530. A portion of the second lens unit 400 may be inserted and secured and/or coupled to the open region 540. However, the disclosure is not limited thereto.

Figure 4:
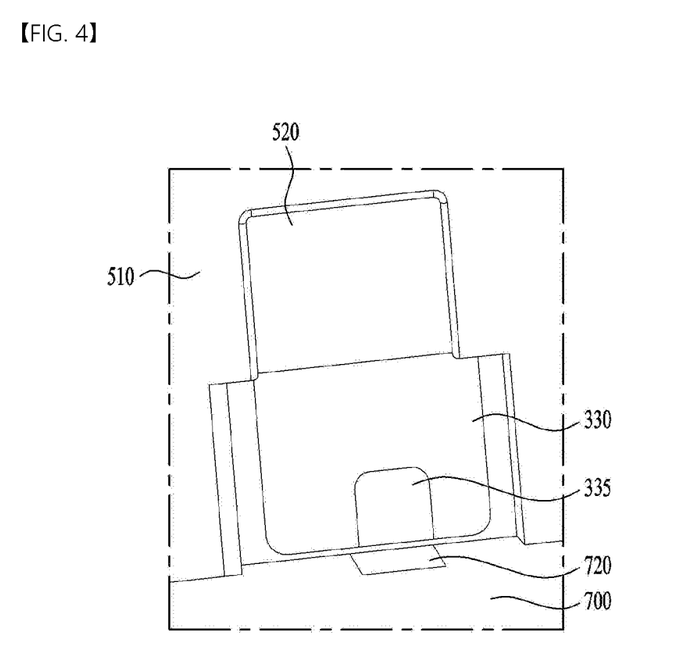
FIG. 4 is a detailed view illustrating one embodiment of region 'A' in FIG. 2.

FIG. 4 is a detailed view illustrating one embodiment of region 'A' in FIG. 2a.

Referring to FIG. 4, the terminal 720 of the sensor board (printed circuit board) 700 is electrically connected to the terminal 335 of the connection board 330. The connection board 330 may be electrically connected to one electrode among electrodes included in the liquid lens 300.

Although it is illustrated that the sensor board 700 includes a single terminal 720 and the connection part 330 includes a single terminal, the disclosure is not limited thereto.

Referring to FIG. 4, the guide portion 520 may be formed on the side portion 510 of the cover, and the guide portion 520 may protrude or be recessed inwards the cover so as to come into surface contact with the connection part 330. That is, the guide portion 520 may be located in the region that faces a first portion of the connection part 330.

The portion of the connection part 330, which corresponds to the height of the illustrated guide portion 520, may be referred to as a first portion. A second portion may be disposed under the first portion, and the terminal 335 may be disposed in the second portion, as shown in the drawings. The width of the first portion may be the same as or similar to the width of the second portion.

At least a portion of the connection part 330 may be disposed on or under the liquid lens 300, and the connection part 330 may extend toward the sensor board 700, on which the image sensor is disposed, along the side surface of the holder 650. A filter may be disposed on the front surface of the image sensor.

Figure 5:
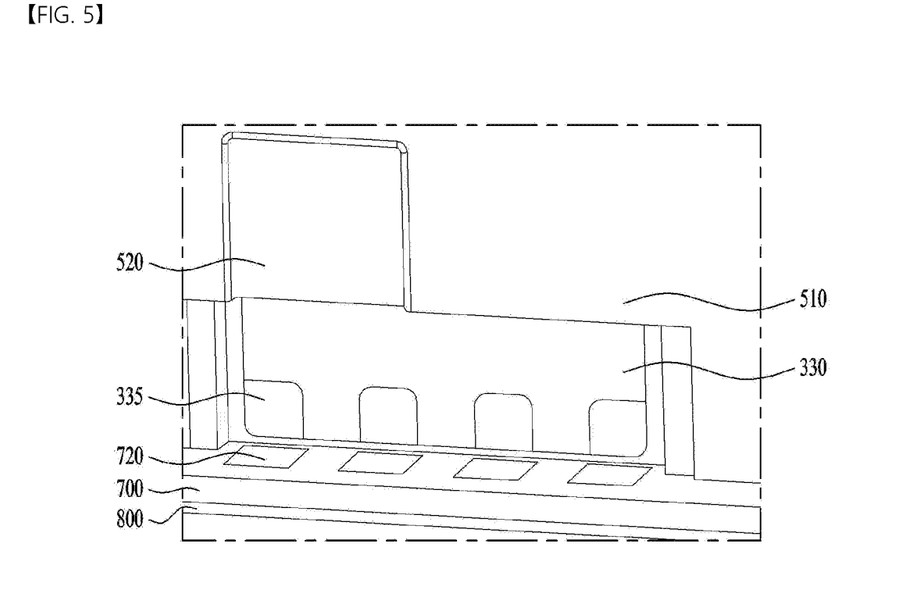
FIG. 5 is a detailed view illustrating one embodiment of region 'B' in FIG. 2.

FIG. 5 is a detailed view illustrating one embodiment of region 'B' in FIG. 2a.

The structure shown in FIG. 5 and the region 'A' shown in FIG. 4 are similar to each other, but differ from each other in terms of the number of terminals 720 of the circuit board on which the image sensor is disposed and the number of terminals 335 of the connection part 330. Specifically, the structure shown in FIG. 5 may be different from the region 'A' in FIG. 4 in that the sensor board 700 includes four terminals 720 and the connection part 330 includes four terminals 335. The connection part 330 may include a first connection part disposed on a first side surface of the holder and a second connection part disposed on a second side surface of the holder. The first side surface of the holder 650, on which the first connection part is disposed, and the second side surface of the holder 650, on which the second connection part is disposed, may not be adjacent to each other. The number of terminals of the first connection part and the number of terminals of the second connection part may be different from each other. The terminals of the circuit board, on which the image sensor is disposed, may be disposed so as to correspond to the positions of the terminals of the first connection part and the second connection part. The connection part 330 and the sensor board 700 may be coupled and/or connected to each other using a conductive member. For example, the terminals of the connection part 330 and the terminals of the sensor board 700 may be coupled and/or connected to each other using a conductive adhesive member. For example, the terminals of the connection part 330 and the terminals of the sensor board 700 may be physically and/or electrically connected to each other through a soldering process.

The portion of the connection part 330, which corresponds to the height of the illustrated guide portion 520, may be referred to as a first portion. A second portion may be disposed under the first portion, and four terminals 335 may be disposed in the second portion, as shown in the drawings. Unlike the region 'A' in FIG. 4, the width of the second portion may be larger than the width of the first portion. Among the plurality of connection parts 330, the width of the second portion of the connection part 330 having a larger number of terminals may be larger than the width of the second portion of the connection part 330 having a smaller number of terminals. The connection part 330 shown in FIG. 4 may be referred to as a first connection board, and the connection part 330 shown in FIG. 5 may be referred to as a second connection board. Here, the first connection board may be electrically connected to the first electrode disposed at the upper side (or the lower side) of the liquid lens, and the second connection board may be electrically connected to the second electrode disposed at the lower side (or the upper side) of the liquid lens.

Further, the first connection board and the second connection board may be disposed opposite each other, with the liquid lens interposed therebetween. As shown in FIG. 3, each of the first connection board and the second connection board may be disposed adjacent to a respective one of the side portions 510 of the cover 500, which are opposite each other. This structure may enable efficient utilization of the space in the cover 500 and may prevent electrical signal interference between the connection boards compared to a structure in which two connection boards are disposed adjacent to one side portion 510 of the cover. Here, a structure in which the connection board is disposed adjacent to the side potion 510 of the cover 500 may refer to a structure in which the connection board is disposed in the internal region of the side portion 510 of the cover.

In the imaging lens having the structure shown in FIGS. 4 and 5, the guide portion provided at the cover may protrude or be recessed toward the inner space of the cover so as to come into surface contact with the connection board, thereby supporting or guiding the connection board.

Figure 6:
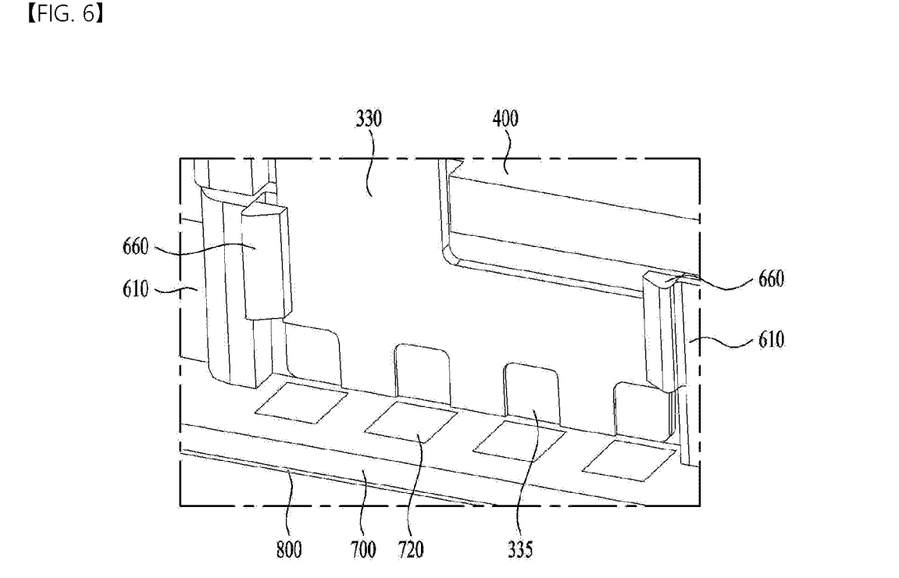
FIG. 6 is a detailed view illustrating another embodiment of region 'A' in FIGS. 2.

FIG. 6 is a detailed view illustrating another embodiment of region 'A' in FIG. 2a.

Referring to FIG. 6, the sensor board 700 may be disposed on the support member 800, four terminals 720 may be disposed on the sensor board 700, and each of the terminals 720 may be electrically connected to a respective one of four terminals 335 of the connection part 330. An open region may be formed in a region of the side portion 510 of the cover 500 that corresponds to the connection part 330 or in a region of the side portion 510 of the cover 500 that faces the connection part 330, and the base 680 may be disposed under the holder 650. Protruding portions may be formed on the side portion 610 of the base toward the open region. The protruding portions may be disposed toward two opposite sides of the connection part, and may include hooks 660, which protrude toward each other. The hooks 660 may serve to guide and support the connection part so that the connection part is easily bent and coupled.

The connection part 330 may include a first portion, which is an upper portion having a smaller width, and a second portion, which is a lower portion having a larger width. Here, the protruding portions may be in surface contact with the second portion of the connection part 330, and may also be in surface contact with the first portion of the connection part 330.

The connection part 330 may be disposed on the bottom surface of the cover toward the liquid lens, i.e. in a direction from below to above in FIGS. 2a and 2b.

A portion of the second lens 400 may be exposed above the second portion of the connection part 330 in the open region.

Figure 7:
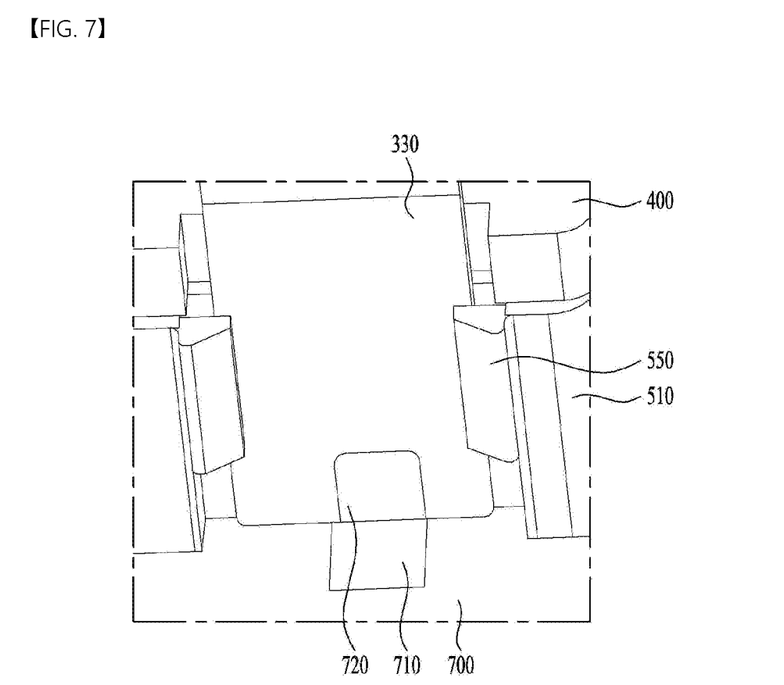
FIG. 7 is a detailed view illustrating another embodiment of region 'B' in FIG. 2.

FIG. 7 is a detailed view illustrating another embodiment of region 'B' in FIG. 2a.

The structure shown in FIG. 7 may be similar to the region 'A' shown in FIG. 6, but may differ from the region 'A' shown in FIG. 6 in that the sensor board 700 includes a single terminal 720 and the connection part 330 includes a single terminal 335.

The connection part 330 shown in FIG. 6 may be referred to as a second connection board, and the connection part 330 shown in FIG. 7 may be referred to as a first connection board. Here, the first connection board may be electrically connected to the first electrode of the liquid lens, and the second connection board may be electrically connected to the second electrode of the liquid lens.

Further, the first connection board and the second connection board may be disposed opposite each other, with the liquid lens interposed therebetween. As shown in FIG. 3, each of the first connection board and the second connection board may be disposed adjacent to a respective one of the side portions 510 of the cover 500, which are opposite each other. This structure may enable efficient utilization of the space in the cover 500 and may prevent electrical signal interference between the connection boards compared to a structure in which two connection boards are disposed adjacent to one side portion 510 of the cover. Here, a structure in which the connection board is disposed adjacent to the side potion 510 of the cover 500 may refer to a structure in which the connection board is disposed in the internal region of the side portion 510 of the cover.

In the imaging lens having the structure shown in FIGS. 6 and 7, the protruding portions provided at the cover may be provided toward the connection board so as to come into surface contact with the connection board, thereby fixing the connection board.

The camera module including the above-described imaging lens may be mounted in various digital devices, such as a digital camera, a smartphone, a laptop computer, and a tablet PC. In particular, the camera module may be mounted in mobile devices to realize an ultra-thin high-performance zoom lens.

For example, a digital device, in which the camera module, including the above-described liquid lens, the first and second lens units, the filter, and the light-receiving element, converts an image incident from the outside into an electrical signal, may include a display module including a plurality of pixels, the colors of which are changed by the electrical signal. The display module and the camera module may be controlled by a control unit.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

INDUSTRIAL APPLICABILITY

A liquid lens module and a camera module including the same according to the embodiments may be used in mobile devices.

The invention claimed is:

1. A camera module, the camera module comprising:
a cover;
a holder disposed inside the cover;
a solid lens and a liquid lens disposed inside the holder; and
a connection board supplying current to the liquid lens,
wherein the holder comprises a first opening and a second opening formed opposite the first opening in a direction perpendicular to an optical axis,
wherein the liquid lens is disposed in the first opening and the second opening, and
wherein a guide portion is formed on a region of the cover, which faces the connection board, so as to protrude from an inner side surface of the cover toward the connection board.

2. The camera module according to claim 1, wherein the guide portion is formed such that a portion of the cover is recessed inwards.

3. The camera module according to claim 2, wherein the connection board is disposed on a side surface of the holder and extends in a direction parallel to the optical axis, and wherein the guide portion is in surface contact with a first portion of the connection board.

4. The camera module according to claim 3, wherein the connection board comprises a second portion disposed under the first portion, the second portion having a larger width than the first portion.

5. The camera module according to claim 1, wherein the connection board comprises a first connection board and a second connection board, and
wherein the first connection board is connected to a first electrode of the liquid lens, and the second connection board is connected to a second electrode of the liquid lens.

6. The camera module according to claim 5, wherein the first connection board and the second connection board are disposed opposite each other, with the liquid lens interposed therebetween.

7. The camera module according to claim 1, wherein the connection board is connected between the guide portion and the holder.

8. The camera module according to claim 1, wherein the connection part comprises:
a first connection part disposed on a first side surface of the holder; and
a second connection part disposed on a second side surface of the holder, and
wherein the first side surface and the second side surface are not adjacent to each other.

9. The camera module according to claim 1, wherein the liquid lens comprises:
a first plate including a cavity formed therein to accommodate a first liquid, which is conductive, and a second liquid, which is non-conductive, therein;
a first electrode disposed on the first plate;
a second electrode disposed under the first plate;
a second plate disposed on the first electrode; and
a third plate disposed under the second electrode.

10. The camera module according to claim 3, wherein the first portion of the connection board is a portion positioned at a height at which the connection board faces the guide portion.

11. An optical device comprising the camera module according to claim 1.

12. A camera module, comprising:
a holder;
a solid lens and a liquid lens disposed inside the holder;
a connection board supplying current to the liquid lens; and
a base disposed under the holder,
wherein the base comprises a first protruding portion and a second protruding portion that protrude toward two opposite sides of the connection board, and
wherein the first protruding portion and the second protruding portion respectively comprise a first hook and a second hook that protrude toward each other.

13. The camera module according to claim 12, further comprising a cover in which the holder is disposed,
wherein the cover comprises an open region through which a portion of the connection board is exposed outside, and
wherein the first protruding portion and the second protruding portion are disposed at a position corresponding to the open region.

14. The camera module according to claim 13, wherein the connection board is disposed on a side surface of the holder and extends in a first direction, and wherein the first protruding portion and the second protruding portion are disposed opposite each other in a second direction that is perpendicular to the first direction.

15. The camera module according to claim 12, wherein the connection board comprises a first portion and a second portion disposed under the first portion, the second portion having a larger width than the first portion, and
wherein the first protruding portion and the second protruding portion are in contact with the second portion.

16. The camera module according to claim 12, wherein the liquid lens comprises:
a first plate including a cavity formed therein to accommodate a first liquid, which is conductive, and a second liquid, which is non-conductive, therein;
a first electrode disposed on the first plate;
a second electrode disposed under the first plate;
a second plate disposed on the first electrode; and
a third plate disposed under the second electrode.

17. The camera module according to claim 12, wherein the connection board comprises a first connection board and a second connection board, and
wherein the first connection board is connected to a first electrode of the liquid lens, and the second connection board is connected to a second electrode of the liquid lens.

18. The camera module according to claim 17, wherein the first connection board and the second connection board are disposed opposite each other, with the liquid lens interposed therebetween.

19. The camera module according to claim 14, wherein the first direction is a direction from a bottom surface of the cover toward the liquid lens.

20. The camera module according to claim 15, wherein the first protruding portion and the second protruding portion are in surface contact with the second portion.

* * * * *